Patented Dec. 31, 1935

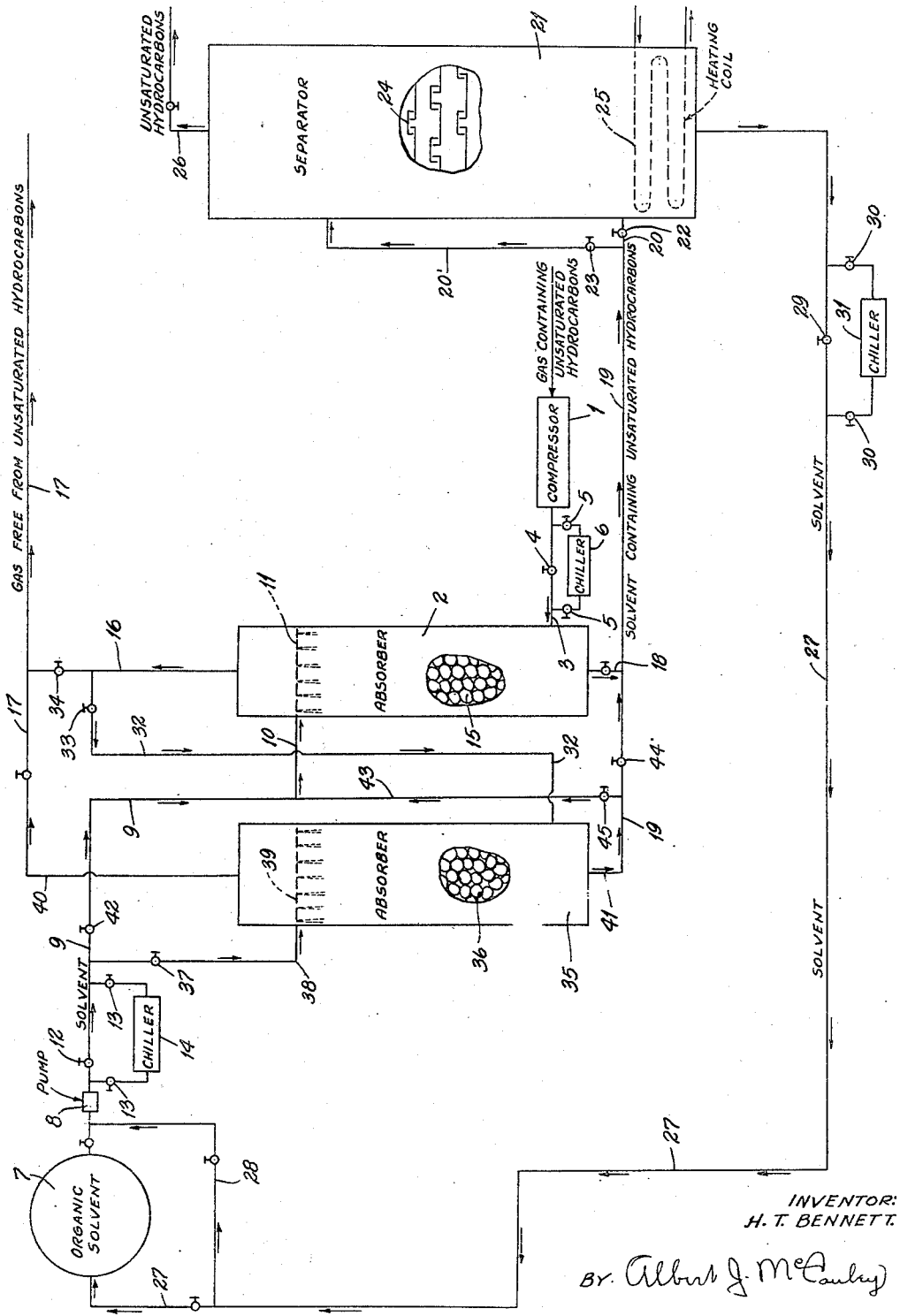

2,026,265

UNITED STATES PATENT OFFICE 2,026,265

PROCESS OF RECOVERING OLEFINE HYDROCARBONS FROM GASES

Harry T. Bennett, Tulsa, Okla., assignor to Mid-Continent Petroleum Corporation, Tulsa, Okla., a corporation of Delaware Application August 9, 1933, Serial No. 684,409

10 Claims. (Cl. 260—170)

This invention relates to processes of recovering unsaturated hydrocarbons from gases, and more specifically to the treatment of a gas with a selective solvent to recover unsaturated hydrocarbons, such as ethylene, propylene, butylene, amylene, and higher olefins.

Prior to this invention it has been difficult to remove these unsaturated hydrocarbons from gases without a contamination thereof by the reaction products formed by the action of chemicals that were used for the removal of these unsaturated hydrocarbons. For example, when sulphuric acid is employed polymerization products are formed, and the acid has a corrosive action on the equipment. These old methods have, therefore, been unsatisfactory and relatively expensive.

An object of this invention is to provide an economical process whereby unsaturated hydrocarbons can be removed from a gas without the contamination which occurs when reaction products are formed by the action of chemicals. I have found that certain organic solvents will readily absorb the unsaturated hydrocarbons, without decomposition, and as the organic solvents simply act as absorbing mediums, no chemical reaction occurs.

Another object is to provide a process wherein the material employed to remove the unsaturated hydrocarbons may be repeatedly reused with substantially no decomposition of either the material employed or the unsaturated hydrocarbons.

Another object is to provide a system whereby the unsaturated hydrocarbons may be continuously extracted from a gas.

With the foregoing and other objects in view, the invention comprises the novel method, hereinafter more specifically described and shown in the accompanying drawings, which illustrate one form of the invention. However, it is to be understood that the invention comprehends changes, variations and modifications which come within the scope of the claims hereunto appended.

I have found that organic solvents, such as ethers, ketones, alcohols, etc., may be very effectively employed to selectively remove unsaturated hydrocarbons from gases, such as gases from stills, including cracking stills, and gases from other sources. These organic solvents which merely absorb the unsaturated hydrocarbons, eliminate the decomposition and contamination which occur in the ordinary processes.

I prefer to use a chlorinated solvent such as BB' dichlorethyl ether. However, excellent results may be obtained by using acetone, amyl alcohol, and isopropyl ether, and the like.

The gas to be treated may be contacted with an organic solvent under a pressure higher than atmospheric pressure and at a relatively low temperature to provide for a very efficent absorption of the unsaturated hydrocarbons in the solvent. However, the absorption of the unsaturated hydrocarbons may, if desired, be carried out at atmospheric pressure and at atmospheric temperatures, or at atmospheric pressure and at a low temperature, or at a high pressure and normal atmospheric temperatures.

The absorbed unsaturated hydrocarbons may be readily removed from the solvent by raising the temperature or reducing the pressure on the solvent, or preferably by both raising the temperature and reducing the pressure.

To aid in describing one form of the invention, I will refer to the accompanying drawing which is a diagrammatical view of an apparatus adapted for use in carrying out the invention.

The incoming gas, containing unsaturated hydrocarbons, may be subjected to pressure in a compressor 1 and transferred to an absorber 2 through a pipe 3; or if desired a valve 4 in the pipe 3 may be closed and valves 5 may be opened, so that the compressed gas will pass through a chiller 6 before entering the absorber 2.

An organic solvent may be transmitted from a container 7 through a pump 8 and pipes 9 and 10 to a spray pipe 11 in the absorber 2. Before entering the absorber 2, the organic solvent may be cooled by closing a valve 12 in the pipe 9 and opening valves 13 so that the solvent will pass through a chiller 14.

The solvent which enters absorber 2 through spray pipe 11 flows counter-currently to the gas entering through pipe 3. The quantity of solvent employed for treating each 1000 cubic feet of gas may be 35 to 63 gallons, but this invention is not limited to such quantities as there may be decided variations according to solvents used and results desired. The absorber 2 is preferably provided with baffling elements 15, of any suitable type, such as raschig rings, bubble plates, etc., to obtain an intimate contact of the solvent with the gas.

The treated gas may flow from the absorber 2 through a pipe 16 and pass out of the system through pipe 17 if the gas is substantially free of unsaturated hydrocarbons.

The solvent containing the unsaturated hydrocarbons may pass from the bottom of the absorber 2 through pipes 18 and 19 to either of the pipes 20 or 20' and then into the separator 21. The pipes 20 and 20' are provided with pressure release valves 22 and 23 respectively to obtain the desired reduction in pressure in the separator and to provide for the selective admission of the solvent at different elevations in the separator 21.

The separator 21 may be provided with any suitable baffle members, such as the bubble plates 24, and an internal heating coil 25, through which steam may be transmitted to heat the solvent.

The unsaturated hydrocarbons in the form of a gas pass upwardly and out of the top of the separator 21 through the pipe 26. The recovered solvent may pass from the separator through pipe 27 to the solvent container 7, or it may be passed through a pipe 28 and returned through the pipe 9 for a further treatment of a gas in the system.

The solvent, after leaving the separator 21, may be cooled by closing a valve 29 in the pipe 27, and opening valves 30 so that the solvent will pass through a chiller 31.

Instead of discharging the treated gas from absorber through pipes 16 and 17, I may transmit this gas through a pipe 32, by opening a valve 33 and closing a valve 34, to an absorber 35 which has baffling elements 36 similar to the elements 15 in absorber 2.

The absorber 35 may also receive solvent flowing through pipe 9 by opening a valve 37 so that solvent will flow through a pipe 38 and spray pipe 39, into the absorber 35.

The gas which is free from unsaturated hydrocarbons will flow from absorber 35 through pipe 40 to the discharge pipe 17. The solvent containing unsaturated hydrocarbons may be transmitted from absorber 35 through a pipe 41 to the pipe 19, and thence to the separator 21 where the unsaturated hydrocarbons are removed from the solvent.

In the foregoing operations the gas containing unsaturated hydrocarbons is treated with fresh solvent entering both of the absorbers. In actual practice, I prefer to subject the incoming gas to a preliminary treatment with a solvent from a former extraction operation to remove some of the unsaturated hydrocarbons from the gas. Thereafter, the gas from which these unsaturated hydrocarbons have been removed is treated with fresh solvent so as to further remove its unsaturated hydrocarbons.

As a specific illustration of a successive counter-current treatment of a gas with fresh and used solvent, I will refer to the use of BB' dichlorethyl ether, which is a chlorinated ether, in the system shown in the drawing.

A pressure still gas, produced in cracking petroleum hydrocarbons, may be subjected to a pressure of thirty pounds in the compressor 1 and passed through the chiller 6 to the absorber 2. This gas may travel through absorber 2, pipes 16 and 32, absorber 35, pipe 40 and discharge pipe 17. The gas may flow through the absorbers at a rate of about one, or one and one-half feet per second.

The gas flowing through the absorbers may be treated with BB' dichlorethyl ether at the rate of fifty gallons for 1000 cubic feet of gas. This solvent is pumped from the container 7, cooled to about 32° F. in the chiller 14 and transmitted to absorber 35 through pipes 9 and 38, valve 42 being closed and valve 37 being open.

The fresh dichlorethyl ether flowing through the absorber 35 will remove unsaturated hydrocarbons contained in the gas that has been previously treated in the absorber 2. After passing through absorber 35, the dichlorethyl ether containing unsaturated hydrocarbons is transmitted through pipes 41, 19, 43, and 10 to the absorber 2, valve 44 in pipe 19 being closed and valve 45 in pipe 43 being open.

This dichlorethyl ether containing unsaturated hydrocarbons will give the gas flowing through absorber 2 a preliminary treatment to remove some of the unsaturated hydrocarbons. The dichlorethyl ether after passing through absorber 2 may be transferred by pipes 18, 19 and pipe 20' to separator 21, valve 23 in pipe 20' being regulated to provide for a reduction in the pressure of the solvent entering the separator 21.

The discharge pipe 26 is provided with a valve to regulate the pressure in the separator 21.

By reducing the pressure on the solvent in separator 21 many of the unsaturated hydrocarbons will vaporize and pass through pipe 26. The remaining unsaturated hydrocarbons will be removed from the solvent by the heat supplied from the heating coil 25.

The recovered dichlorethyl ether may be withdrawn from separator 21 and cooled in the chiller 31, and then transferred by pipe 27 to the organic solvent container 7, or it may be by-passed through the pipe 28 and returned directly to the absorber 35. The solvent is thus transmitted in a continuous endless course wherein it absorbs and then releases the unsaturated hydrocarbons, while remaining in the system for an indefinite period to continually perform its function in the recovery of these hydrocarbons from a continuous stream of gas.

While I have referred to certain solvents, it is evident that other organic solvents having a selective action for the unsaturated hydrocarbons may be employed, and if desired two or more solvents may be used.

I claim:

1. The process of treating gaseous mixtures to remove olefins contained therein, which comprises contacting the gas mixture with dichlorethyl ether to selectively absorb olefins in the dichlorethyl ether, and removing olefins from said dichlorethyl ether.

2. The process of treating gas mixtures to remove olefins contained therein, which comprises contacting the gas mixture with an organic solvent selected from the group consisting of BB' dichlorethyl ether, amyl alcohol and isopropyl ether to absorb olefins in the solvent, and removing absorbed olefins from said solvent.

3. The process of treating gaseous mixtures to remove olefins contained therein, which comprises contacting the gaseous mixture with dichlorethyl ether at a relatively low temperature to selectively absorb olefins in the dichlorethyl ether, and removing absorbed olefins from said dichlorethyl ether.

4. The process of treating gaseous mixtures to remove olefins contained therein, which comprises contacting the gaseous mixture with dichlorethyl ether under a pressure greater than atmospheric pressure to absorb olefins in the dichlorethyl ether, and removing absorbed olefins from said dichlorethyl ether.

5. The process of treating gas mixtures to remove olefins contained therein, which comprises contacting the gas mixture with an organic solvent selected from the group consisting of BB' dichlorethyl ether, amyl alcohol and isopropyl ether, selectively absorbing olefins in the solvent under a pressure greater than atmospheric pressure and at a relatively low temperature, and removing absorbed olefins from said solvent.

6. The process of treating gaseous mixtures to remove olefins contained therein, which comprises contacting the gaseous mixture with dichlorethyl ether to absorb olefins in the dichlorethyl ether, and heating said dichlorethyl ether to recover olefins therefrom.

7. The process of treating gaseous mixtures to remove olefins contained therein, which comprises contacting the gaseous mixture with dichlorethyl ether, absorbing olefins in the dichlorethyl ether under a pressure greater than atmospheric pressure and at a relatively low temperature, and thereafter reducing the pressure on said dichlorethyl ether and increasing the temperature thereof to recover olefins from said dichlorethyl ether.

8. In the art of treating pressure still gases to remove olefins contained therein, the process which comprises transmitting an organic solvent selected from the group consisting of BB' dichlorethyl ether, amyl alcohol, and isopropyl ether in an endless course through an absorption station wherein the olefins are selectively absorbed in said solvent, and then through a separating station where the absorbed olefins are removed from the solvent, said solvent being repeatedly transmitted through said endless course including said stations to permit a continual reuse of the solvent.

9. In the art of treating pressure still gases to remove olefins contained therein, the process which comprises contacting the gas with an organic solvent selected from the group consisting of dichlorethyl ether, amyl alcohol and isopropyl ether, while subjecting said gas and solvent to a relatively low temperature and to a pressure greater than atmospheric pressure, and thereafter reducing the pressure on said solvent and increasing the temperature thereof to recover the olefins from said solvent.

10. In the art of treating cracked still gases to remove olefins contained therein, the process which comprises continuously transmitting BB' dichlorethyl ether into a system wherein the gas is to be treated, continuously introducing the cracked gas into the system, subjecting the gas to successive absorption treatments wherein the dichlorethyl ether is repeatedly employed to select and absorb olefins from other constituents of the cracked gas, said successive treatments including the steps of absorbing olefins of the gas into the incoming dichlorethyl ether, and contacting the incoming gas with the dichlorethyl ether containing absorbed olefins.

HARRY T. BENNETT.